US011865733B2

(12) United States Patent
Röder et al.

(10) Patent No.: US 11,865,733 B2
(45) Date of Patent: Jan. 9, 2024

(54) ELECTRIC BEARD TRIMMER

(71) Applicant: Braun GmbH, Kronberg (DE)

(72) Inventors: Roman Röder, Oberursel (DE); Andreas Peter, Kronberg (DE); Bernhard Sikora, Kelkheim (DE)

(73) Assignee: Braun GMBH, Kronberg (DE)

( * ) Notice: Subject to any disclaimer, the term of this patent is extended or adjusted under 35 U.S.C. 154(b) by 211 days.

(21) Appl. No.: 17/313,292

(22) Filed: May 6, 2021

(65) Prior Publication Data

US 2021/0347070 A1 Nov. 11, 2021

(51) Int. Cl.
*B26B 19/06* (2006.01)
*B26B 19/04* (2006.01)
*B26B 19/38* (2006.01)

(52) U.S. Cl.
CPC .......... *B26B 19/063* (2013.01); *B26B 19/048* (2013.01); *B26B 19/3846* (2013.01); *B26B 19/3873* (2013.01)

(58) Field of Classification Search
CPC ......... B26B 19/00; B26B 19/02; B26B 19/04; B26B 19/042-046; B26B 19/048; B26B 19/06; B26B 19/063; B26B 19/3873; B26B 19/3846
See application file for complete search history.

(56) References Cited

U.S. PATENT DOCUMENTS 2,151,965 A 3/1939 Hanley
2,251,577 A 8/1941 Rand, Jr.
2,273,739 A 2/1942 Te
2,292,858 A 8/1942 Adalbert
2,948,063 A * 8/1960 Jepson .................. B26B 19/042 30/346.51
3,060,574 A * 10/1962 Thomas .................. B26B 19/20 30/202
3,093,899 A 6/1963 Bodo
3,280,456 A * 10/1966 Erickson ............... B26B 19/205 30/201
4,133,103 A 1/1979 Beck
5,979,060 A * 11/1999 Holzbauer .............. B26B 19/20 30/200

(Continued)

FOREIGN PATENT DOCUMENTS

CH 353651 A 4/1961
CN 102452095 A 5/2012

(Continued)

OTHER PUBLICATIONS

Extended EP Search Report and Written Opinion for 20173678.2 dated Jan. 29, 2021, 13 Pages.

(Continued)

*Primary Examiner* — Adam J Eiseman
*Assistant Examiner* — Richard D Crosby, Jr.
(74) *Attorney, Agent, or Firm* — Kevin C. Johnson; Gerd Zetterer

(57) ABSTRACT

The present invention relates to cutting body hair such as beard stubbles of multidays' beard. More particularly, the present invention relates to a cutter system for an electric shaver and/or trimmer, comprising a pair of cooperating cutting elements with two rows of comb-like cutting teeth at opposite edges thereof.

18 Claims, 9 Drawing Sheets

(56) References Cited

U.S. PATENT DOCUMENTS

| | | | |
|---|---|---|---|
| 6,279,234 | B1 * | 8/2001 | Chaouachi .............. B26B 19/20 30/200 |
| 9,381,655 | B2 * | 7/2016 | Lau ......................... B26B 19/22 |
| 10,391,647 | B2 * | 8/2019 | Phoon ..................... B26B 19/20 |
| 10,406,702 | B2 * | 9/2019 | Vredeveld ........... B26B 19/3846 |
| 10,647,010 | B2 * | 5/2020 | Sablatschan ........ B26B 19/3893 |
| 10,682,777 | B2 * | 6/2020 | Huisman ............. B26B 19/3846 |
| 11,351,684 | B2 | 6/2022 | Phoon |
| 2005/0097757 | A1 | 5/2005 | Mccambridge et al. |
| 2008/0134512 | A1 | 6/2008 | Putzer |
| 2011/0119929 | A1 * | 5/2011 | Lau ......................... B26B 19/06 30/223 |
| 2017/0028574 | A1 * | 2/2017 | Iaccarino .............. B26B 19/063 |
| 2017/0113361 | A1 * | 4/2017 | Feijen ................. B26B 19/3893 |
| 2017/0144319 | A1 * | 5/2017 | Sablatschan .......... B26B 19/042 |
| 2017/0190063 | A1 * | 7/2017 | Schratter ............... B26B 19/042 |
| 2017/0361476 | A1 * | 12/2017 | Phoon ................... B26B 19/063 |
| 2018/0009121 | A1 * | 1/2018 | Stapelbroek ........ B26B 19/3846 |
| 2018/0021965 | A1 | 1/2018 | Phoon et al. |
| 2018/0257248 | A1 * | 9/2018 | Wu ......................... B26B 19/08 |
| 2018/0281213 | A1 * | 10/2018 | Eijkelkamp ........... B26B 19/386 |
| 2021/0347069 | A1 | 11/2021 | Röder et al. |
| 2021/0347071 | A1 | 11/2021 | Xu et al. |
| 2021/0347072 | A1 | 11/2021 | Xu et al. |
| 2021/0347076 | A1 | 11/2021 | Xu et al. |

FOREIGN PATENT DOCUMENTS

| | | | |
|---|---|---|---|
| CN | 204339817 | U | 5/2015 |
| CN | 104999484 | A | 10/2015 |
| CN | 204894008 | U | 12/2015 |
| CN | 106346519 | A | 1/2017 |
| CN | 108724253 | A | 11/2018 |
| CN | 209190826 | U | 8/2019 |
| CN | 209478241 | U | 10/2019 |
| DE | 19939509 | A1 | 3/2001 |
| EP | 0707926 | A1 | 4/1996 |
| EP | 2875915 | A1 | 5/2015 |
| EP | 2875916 | A1 | 5/2015 |
| EP | 3388207 | A1 | 10/2018 |
| EP | 3461602 | A1 | 4/2019 |
| EP | 3466619 | A1 | 4/2019 |
| GB | 501137 | A | 2/1939 |
| GB | 719005 | A | 11/1954 |
| JP | H10323463 | A | 12/1998 |
| JP | 2017511230 | A | 4/2017 |
| KR | 20060125507 | A | 12/2006 |
| WO | 2015158923 | A1 | 10/2015 |

OTHER PUBLICATIONS

Extended EP Search Report and Written Opinion for 21172559.3 dated Sep. 15, 2021, 11 Pages.

PCT Search Report and Written Opinion for PCT/IB2021/053850 dated Aug. 31, 2021, 15 pages.

Extended EP Search Report and Written Opinion for 21172558.5 dated Sep. 17, 2021, 8 Pages.

PCT Search Report and Written Opinion for PCT/IB2021/053847 dated Aug. 4. 2021,14 pages.

Non-Final Office Action; U.S. Appl. No. 17/313,273 dated Feb. 15, 2023.

Non-Final Office Action; U.S. Appl. No. 17/313,309 dated Feb. 15, 2023.

Non-Final Office Action; U.S. Appl. No. 17/313,396 dated Oct. 27, 2022.

Notice of Allowance; U.S. Appl. No. 17/313,396 dated Mar. 13, 2023.

* cited by examiner

ELECTRIC BEARD TRIMMER

RELATED APPLICATIONS

This application claims the benefit of European Patent Application Publication No. EP3907044A1, filed May 8, 2020, which is hereby incorporated by reference in its entirety.

FIELD OF THE INVENTION

The present invention relates to cutting body hair such as beard stubbles of multidays' beard. More particularly, the present invention relates to a cutter system for an electric shaver and/or trimmer, comprising a pair of cooperating cutting elements with two rows of comb-like cutting teeth at opposite edges thereof and at least one field of cutting perforations between said rows of comb-like cutting teeth, which cutting perforations are formed in a skin contact surface or skin facing surface of said cutting elements, wherein said cutting elements are movably supported relative to each other by a support structure which provides for a pivot axis about which said cooperating cutting elements are pivotable to follow the skin contour, said pivot axis extending substantially parallel to a longitudinal direction of said rows of comb-like cutting teeth.

BACKGROUND OF THE INVENTION

Electric shavers and trimmers utilize various mechanisms to provide hair cutting functionality. Some electric shavers include a perforated shear foil cooperating with an undercutter movable relative thereto so as to cut hairs entering the perforations in the shear foil. Such shear foil type shavers are often used on a daily basis to provide for a clean shave wherein short beard stubbles are cut immediately at the skin surface.

On the other hand, other cutter systems including a pair of cooperating cutting elements with comb-like edges including one or more rows of comb-like or rake-like cutting teeth reciprocating or rotating relative to each other, are often used for cutting longer beard stubbles or problem hair that is difficult to cut due to, for example, a very small angle to the skin or growing from very resilient skin. The teeth of such comb-like or rake-like cutting elements usually project substantially parallel to each other or substantially radially, depending on the type of driving motion, and may cut hairs entering into the gaps between the cutting teeth, wherein cutting or shearing is achieved in a scissor-like way when the cutting teeth of the cooperating elements close the gap between the finger-like cutting teeth and pass over each other.

Such cutter systems for longer hairs may be integrated into electric shavers or trimmers which at the same time may be provided with the aforementioned shear foil cutters. For example, cutting elements may include two rows of comb-like cutting teeth arranged, for example, at opposite sides of the cutting elements and a field of shear foil-like cutting perforations between said rows of comb-like cutting teeth.

For example, EP 24 25 938 B1 shows a shaver with a pair of long hair trimmers integrated between shear foil cutters. Furthermore, EP 27 47 958 B1 and CN 206 287 174 U disclose hair trimmers having two rows of cooperating cutting teeth arranged at opposite sides of the shaver head, wherein the cutting teeth of the upper comb-like cutting element are provided with rounded and thickened tooth tips overhanging the tooth tips of the lower cutting element so as to prevent the projecting tooth tips from piercing into the skin and from irritating the skin.

A similar cutter system is shown in US 2017/0050326 A1 wherein in such cutter system the lower comb-like cutting element is fixed and the upper comb-like cutting element is movable.

Shavers and/or trimmers combining rows of comb-like cutting teeth at opposite edges and shear foil-like cutting perforations between said rows of comb-like teeth sometimes include C-shaped outer cutting elements the edges of which are dog-eared to form limbs bent inwardly like the limbs of a C or a U, wherein such dog-eared limbs are held by a support frame. The transitional edge portion connecting the dog-eared limbs with the central portion of the outer cutting element is contoured or configured to form a row of comb-like teeth for cutting longer stubbles, whereas the central portion of the cutting element is provided with at least one field of perforations for cutting short hair. Said outer cutting element cooperates with an inner cutting element which may be plate-shaped and may include rows of comb-like teeth at opposite edges to cooperate with the comb-like teeth of the outer cutting element, and furthermore at least one field of perforations or other cutouts between the comb-like toothed edges for cooperating with the perforations in the outer cutting element.

Thus, shear foil like cutting perforations for cutting short hairs and comb-like cutting teeth for cutting longer hairs or stubbles may be integrated into the same cutting elements, wherein the inner cutting element may be biased against the outer cutting element usually by means of a spring device which may include a pair of flexible spring arms extending from a central base portion of the support structure towards the inner cutting element. Said spring arms may have a sort of V-shaped configuration and may contact the inner cutting element at sections between the central field of perforations and the opposite toothed edges. Due to such biasing of the inner cutting element against the outer cutting element, tugging and pulling hairs to be cut in the perforations can be avoided, but, on the other hand, the friction between the cutting elements is rather high what causes high energy consumption by the drive unit and furthermore heating of the cutting elements what is often felt unpleasing or uncomfortable. Such cutter systems are shown in documents CN 209 478 241 U and US 2018/0257248 A1.

A similar cutter system is disclosed by EP 31 31 716 B1, wherein the support structure includes an outer frame holding the outer cutting element at opposite edge portions thereof, wherein such outer frame includes, at its inner surface, a step-like projection forming a shoulder for supporting the inner cutting element at the toothed, comb-like edges. The support structure includes a four-bar linkage mechanism connecting the cutter system to a handle of the trimmer and allowing the cutting elements to pivot about a pivot axis parallel to the axis of reciprocating. Due to the four-bar linkage system, said pivot axis is no fixed axis, but may move along a path defining the possible positions of the instantaneous center of rotation. Such four-bar-linkage tends to be flexible and thus, may affect the transmission of driving action to the cutting elements via a drive train bridging the gap between the handle and the cutter head.

Such beard stubble trimmers and shavers need to address quite different and diverging functional requirements and performance issues such as closeness, thoroughness, good visibility of the cutting location, efficiency and pleasant skin feel, good ergonomics and handling. Closeness means short or very short remaining stubbles, whereas thoroughness means less missed hairs particularly in problem areas like the neck. Efficiency means less and faster strokes suffice to achieve the desired trimming result. Pleasant skin feel depends on the individual user, but often includes less irritation in form of nicks, cuts or abrasion and better gliding onto the skin. Visibility of the cutting location is particularly important in case of styling or edging contours to accomplish hair removal with local accuracy.

Fulfilling such various performance issues at the same time is quite difficult. Meeting such needs becomes even more difficult when different types of cutting contours such as shear foil-like perforations and comb-like rows of teeth are integrated into the same cutting elements such as C-shaped cutting blades reciprocating relative to each other since such multiple-function cutter elements may not be adapted exclusively to one specific cutting function.

SUMMARY OF THE INVENTION

It is an objective underlying the present invention to provide for an improved cutter system avoiding at least one of the disadvantages of the prior art and/or further developing the existing solutions. A more particular objective underlying the invention is to provide for a close and thorough cutting of hair and longer stubbles including a good control of edging contours and, at the same time, avoiding skin irritations. A further objective is a good adaption of the cutter system to the skin contour without posing risks of skin injuries due to uncontrolled pivoting of the cutting elements. Another objective underlying the present invention is a reliable and clean cutting action of the cooperating cutting teeth and optionally cutting perforations to avoid pulling and tugging of hair, without sacrificing low friction between the cutting elements, low temperatures of the cutting teeth and low energy consumption and thus long energy storage life.

According to an aspect, there is provided a U- or V-shaped pivot axis holder provided which is made from metal. Although this adds substantial cost to the device it revealed that the critical support of the cutting elements due to the dimensioning of the clearance between the pivot axis supports is better assured and thus the free of movability/pivoting of the cutting elements is maintained also under harsh usage conditions.

More particularly, other parts of the support structure are made from plastic and/or metal. Preferably the part of the support structure which adds to the pivot axis support and which is connected with at least one of the cutting elements is made from metal in order to assure best stability under tough usage conditions. Alternatively, the support structure may be made from plastic for better manufacturability. Further alternatively, the support structure may comprise a part made form metal and another part made from plastic, wherein the plastic part is the covering up the metal internal part of the support structure.

According to another aspect the pivot axis holder is visible and at least partly uncovered by any housing part—except for the direct connection area to adjacent housings or chassis parts. This assures that hair stubble accumulation is prevented in the area of the pivot axis holder or can be easily removed in case of need. Thus, the handle housing comprises a lower end (e.g. connect ably with a plug) and an upper end. The pivot axis holder is provided above the upper end of the handle and its housing so that same is uncovered by a housing part.

According to an aspect, the cutter system may pivot relative to a handle about an eccentric pivot axis which is not arranged symmetrically with respect to the opposite rake-like cutting edges for cutting longer hairs so pivoting the cutting elements about said pivot axis causes larger movements of one of said rake-like cutting edges in comparison to the other rake-like cutting edge. More particularly, said pivot axis is positioned offset from a middle plane which extends perpendicular to a center section of the skin contact surface and/or skin facing surface of the cutter elements so that said pivot axis is closer to a first one of said rows of comb-like cutting teeth than to a second one of said rows of comb-like cutting teeth. When pivoting, the first row of comb-like cutting teeth which is closer to the pivot axis, makes less or shorter transverse movements, whereas the second row of comb-like cutting teeth further away from the pivot axis makes more or larger transverse movements. Said transverse movements follow a circular path around said pivot axis, wherein the length of the movement depends on the lever arm or pivoting arm, i.e. the distance from the pivot axis.

More particularly, the pivot axis may be arranged closer to the row of comb-like cutting teeth which is usually used as a leading edge going ahead when moving the cutter system along the skin to be shaved. Depending on certain aspects of the shaver and/or trimmer such as position and/or orientation of the cutting elements relative to a handle and/or the position and orientation of the skin contact surface relative thereof in a home position of the cutting elements and/or protrusion of the cutting elements towards a certain side of the handle and/or an offset and/or cranking of the cutter head vis-à-vis a longitudinal axis of the handle and/or the arrangement of operation keys such as an on/off key at the handle suggesting a certain way of gripping the handle, the cutter system may have a common moving direction or preferred moving direction in which a major number of users intuitively move the cutter system over the skin to be shaved so that one rake-like cutting edge is the leading edge and the other rake-like cutting edge is the trailing edge, it is moved in such moving direction of preference of most users.

Offsetting the pivot axis towards the preferred leading edge of the cutter system, i.e. to the row of comb-like cutting teeth forming the leading edge when moving the cutter system in said common moving direction of most users, makes movements of the leading edge transverse to the skin to be shaved and occurring due to pivoting above the pivot axis, smaller and thus, makes the user feel more comfortable and reduces the risk of skin irritations or injuries like small cuts. The larger transverse movements at the opposite side, i.e. at the trailing edge, due to such pivoting of the cutter system is less critical and does not have a negative impact on comfort or risk of injuries and skin irritations.

In a home position or neutral position or initial position of said cutting elements relative to the pivot axis, said cutting elements may be inclined relative to a longitudinal handle axis at an acute angle so that the skin contact and/or skin facing surface of the cutter elements faces towards a front side of the handle of the shaper/trimmer Considering such inclination of the cutting elements towards said front side in a home position, the pivot axis is positioned closer to the row of comb-like teeth positioned at said front side whereas the opposite row of comb-like cutting teeth positioned at the backside of the handle is further away from said pivot axis.

Many users pull the cutter system along the skin to be shaved with said front-side row of cutting teeth forming the leading edge so that positioning the pivot axis closer to said front-side row of comb-like teeth may improve the user's feeling of comfort and may reduce the risk of skin irritations or even skin injuries such as cuts that may be caused when the comb-like cutting teeth move into the skin due to pivoting or the pitch angle towards the skin becomes too steep.

These and other advantages become more apparent from the following description giving reference to the drawings and possible examples.

DETAILED DESCRIPTION OF THE INVENTION

Figure 1:
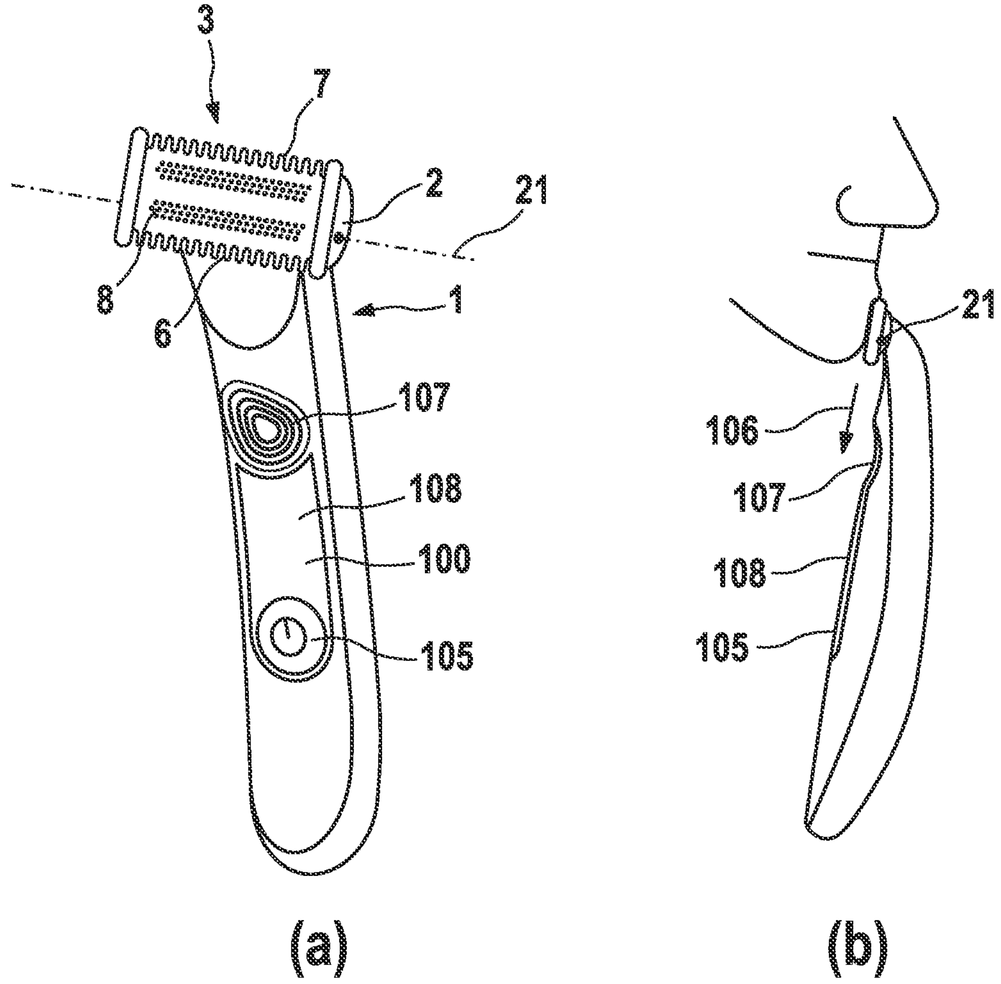
FIG. 1: perspective views of an electric beard trimmer/shaver including a cutting system with a pair of cooperating comb-like cutting elements reciprocating relative to each other, wherein partial view (a) shows a front side of the electric beard trimmer and partial view (b) shows the beard trimmer working on a chin.

So as to allow for more comfortable shaving and/or trimming with self-adaption of the cutter blades to the skin contour and, at the same time, to reduce the risk of skin irritations or even skin injuries, an improved pivot support structure is suggested to reduce transverse movements of a leading cutting edge into the skin due to pivoting of the cutting elements when moving the cutter system along the skin to be shaved and adapting the pitch angle of the cutter system to the skin contour.

More particularly, it is suggested the cutter system may pivot relative to a handle of the trimmer/shaver about an eccentric pivot axis which is not arranged symmetrically with respect to the opposite rake-like cutting edges for cutting longer hairs so pivoting the cutting elements about said pivot axis causes smaller movements of one of said rake-like cutting edges in comparison to the other rake-like cutting edge. More particularly, said pivot axis is positioned offset from a middle plane which extends perpendicular to a center section of the skin contact surface and/or skin facing surface of the cutter elements so that said pivot axis is closer to a first one of said rows of comb-like cutting teeth than to a second one of said rows of comb-like cutting teeth. When pivoting, the first row of comb-like cutting teeth which is closer to the pivot axis, makes a shorter transverse movement, whereas the second row of comb-like cutting teeth further away from the pivot axis makes a longer transverse movement, wherein such transverse movements follow a circular path around said pivot axis, wherein the length of the movement depends on the distance of said rows of teeth from the pivot axis.

More particularly, the pivot axis may be arranged closer to the row of comb-like cutting teeth which is usually used as a leading edge going ahead when moving the cutter system along the skin to be shaved. Depending on certain aspects of the shaver and/or trimmer such as position and/or orientation of the cutting elements or the skin contact surface thereof in a home position of the cutting elements and/or protrusion of the cutting elements towards a certain side of the handle and/or an offset and/or cranking of the cutter head vis-à-vis a longitudinal axis of the handle and/or the arrangement of operation keys such as an on/off key suggesting a certain way of gripping the handle, the cutter system may have a common moving direction or preferred moving direction in which a major number of users intuitively move the cutter system over the skin to be shaved so that one rake-like cutting edge is the leading edge and the other rake-like cutting edge is the trailing edge, it is moved in such common moving direction intuitively preferred by most users.

Offsetting the pivot axis towards the preferred leading edge of the cutter system, i.e. to the row of comb-like cutting teeth forming the leading edge when moving the cutter system in said common moving direction of most users, makes movements of the leading edge transverse to the skin to be shaved and occurring due to pivoting above the pivot axis, smaller and thus make the user feel more comfortable and reduces the risk of skin irritations or injuries like small cuts. The larger transverse movements of the trailing edge due to such pivoting of the cutter system is less critical and does not have a negative impact on comfort or risk on injuries and skin irritations.

In a home position or neutral position or initial position of said cutting elements relative to the pivot axis, said cutting elements may be inclined relative to a longitudinal handle axis at an acute angle so that the skin contact and/or skin facing surface of the cutter elements faces towards a front side of the handle of the shaper/trimmer Considering such inclination of the cutting elements towards said front side in a home position, the pivot axis is positioned closer to the row of comb-like teeth positioned at said front side whereas the opposite row of comb-like cutting teeth positioned at the backside of the handle is further away from said pivot axis. Many users pull the cutter system along the skin to be shaved with said front-side row of cutting teeth forming the leading edge so that positioning the pivot axis closer to said front-side row of comb-like teeth may improve the user's feeling of comfort and may reduce the risk of skin irritations or even skin injuries such as cuts that may be caused when the comb-like cutting teeth move into the skin due to pivoting or the pitch angle towards the skin becomes too steep.

Basically, transverse movements of the leading cutting edge could be completely eliminated when the pivot axis is positioned directly at said leading cutting edge since such position would eliminate the leverage arm or pivoting radius in terms of the distance from the pivot axis. Thus, depending on the aggressiveness of the comb-like cutting teeth and the desired level of comfort, it may be desired to position the pivot axis relatively close to said leading edge. For example, the pivot axis could be positioned in-between the row of comb-like teeth and the field of perforations formed in the skin contact surface.

However, offsetting the pivot axis too much from the center of the cutter system may impair comfort and safety when moving the cutter system in the opposite or non-preferred moving direction over the skin to be shaved. So as to achieve a good compromise, the pivot axis may be spaced apart from said first row of comb-like teeth at a distance which is about 60%-90% or 70%-90% or 75%-85% of the distance between said pivot axis and the opposite second row of comb-like teeth.

Said handle comprises an elongate housing which extends from a lower end to an upper end and wherein said pivot axis holder 41 is provided on top of the upper housing end and is at least partly uncovered by the handle housing.

Thus, the pivot axis may be positioned about 10-40% closer to one row of comb-like cutting teeth than to the other row of comb-like cutting teeth.

So as to achieve good responsiveness of the pivoting of the cutting element and, thus, good adaption to the skin contour for different users which may apply different levels of skin contact pressure, the pivot axis may be positioned close to the skin contact surface so as to reduce the torque and thus pivoting effect of friction. When the cutter system is pressed against the skin and moved along the skin, the friction caused between the skin contact surface and the skin to be shaved tends to or tries to pivot the cutter system about the pivot axis, wherein the leverage arm of such frictional forces becomes the smaller the closer the pivot axis is to the skin contact surface.

More particularly, the pivot axis may be positioned slightly under the skin contact surface and/or within a cutter head chamber encompassed by frame portions of the support structure holding opposite edges of one of the cutting elements and said cutting elements. Such position significantly reduces the leverage of frictional forces relative to the pivot axis and, thus, pivoting torque caused by such frictional forces on the one hand and allows for a compact, space-saving arrangement of the support structure on the other hand.

So as to allow for easy, intuitive use of the shaver/trimmer, the support structure may be configured to provide for a pivoting range of the cutting elements which is asymmetrical with regard to a longitudinal handle axis. In other words, the pivot range may be larger towards one side of the handle than towards the opposite side of the handle. More particularly, the pivot range may be configured such that the skin contact and/or skin facing surface of the cutting elements faces towards the same side of the handle over at least ⅔ or ¾ of said pivot range.

A natural shaver feeling and easy, intuitive use may be achieved when said pivot range allows for various pivoting positions of the cutting elements with an angle of inclination ranging from −20° to +60° or 0°-40°+/−10° or +/−5°, said angle of inclination being defined between a virtual plane extending perpendicular to the longitudinal handle axis and another virtual plane tangential to the skin contact/facing surface of the cutting elements.

So as to urge the cutting elements into a specific home position, a biasing device may be associated with said pivot axis. Such biasing device may be configured to bias the cutting elements about said pivot axis towards an end of a limited pivot range. In other words, the biasing device which may include a spring device, does not urge the cutting elements into a neutral middle position from which it may pivot into opposite directions, but the biasing device tries to urge the cutting elements into an extreme pivot position or an end pivot position from which the cutting elements may pivot only in one direction.

More particularly, the biasing device may be configured to bias the cutting elements into an angular pivoting position with a smallest possible angle of inclination of the skin contact surface vis-à-vis the longitudinal handle axis. If the cutting elements pivot out of said biased home position, the plane tangential to the skin contact surface gets more and more transverse to the longitudinal handle axis and/or tries to approach a position perpendicular to said longitudinal handle axis.

Due to such biased home position in which the skin contact surface is inclined at a rather small angle relative to the longitudinal handle axis, users intuitively pull the cutter system with the aforementioned first row of cutting teeth going ahead over the skin to be shaved. Thus, the eccentric or offset pivot axis allows for fine adaption of the cutting elements to the skin contour and avoids uncontrolled transverse movements potentially posing a risk of skin irritations.

Irrespective of such preferred direction of moving the cutter system, biasing the cutting elements into said home position at the end of the pivoting range may also reduce the risk of skin irritations or even skin injuries when the cutter system is moved over the skin to be shaved in the non-preferred opposite direction, i.e. when the second row of comb-like cutting teeth is the leading edge since said second row of comb-like teeth may deflect due to pivoting rather easily and gives way to the skin, wherein only very low skin contact forces are necessary at such opposite edge as the distance to the pivot axis is rather large and, thus, the leverage of such skin contact forces at the opposite edge is large.

So as to avoid too much flexibility detrimental to efficient transmission of driving forces and/or torque to the cutting elements, said pivot axis may have a fixed position relative to a non-reciprocating one of said cutting elements and/or a fixed position relative to a handle of the shaver/trimmer. Such fixed pivot axis position allows to avoid yielding and bulky bar-linkage mechanisms.

Said support structure may include a rigid pivot axis holder having a mounting portion for fixedly attaching the pivot axis holder to a handle or a chassis portion of the shaver/trimmer, wherein said pivot axis holder may include two frame portions extending into or towards a cutter head chamber defined by said cutting elements and outer frame portions of the support structure 14 holding opposite edges of one of the cutting elements Said other parts of the support structure other than the pivot axis holder are made from separate plastic and/or metal parts.

More particularly, said pivot axis holder may include a U-shaped or V-shaped holding frame element made from metal.

So as to achieve a smooth, comfortable cutting action, it is helpful to avoid separating the cutting elements and thus, the cooperating comb-like teeth and/or the cooperating cutting perforations from one another so as to avoid that hair is no longer properly cut or even clamped between the teeth moving relative to each other or between the cutting perforations moving relative to each other. Basically, this can be prevented by means of pressing the cooperating cutting elements against each other, for example by means of spring devices such as flexible support ribs urging the teeth/perforations of one cutting element against the teeth/perforations of the other cutting element.

In the alternative or in addition to such flexible support ribs, one of the cutting elements may be sandwiched between the other cutting element and support elements or a support structure like a support frame which may include rigid ribs or web-like flanges precisely and rigidly supporting and guiding the inner cutting element at a predetermined position under the outer cutting element and sufficiently close thereto, said rigid support ribs and the outer cutting element defining a gap in which the sandwiched cutting element is slidably and/or movably received, wherein said gap may be slightly thicker than the sandwiched cutting element to provide for some play at least during non-use to reduce friction and heat generation. When the outer cutting element is pressed against the skin or at least contacts the skin during operation of the shaver/trimmer, it may deflect and at least then closely fits onto the inner cutting element. Although the sandwiched cutting element may move relative to the other cutting element without friction or at very low friction, it is nevertheless prevented from deflection even when the thickness of the sandwiched cutting element is very small.

More particularly, one of the cutting elements may be sandwiched between the other cutting element and said flexible or rigid support ribs or web-like flanges supporting and guiding the inner cutting element at a predetermined position under the outer cutting element and sufficiently close thereto, said rigid or flexible support ribs and the outer cutting element defining a gap in which the sandwiched cutting element is slidably and/or movably received, wherein said gap may be slightly thicker than the sandwiched cutting element to provide for some play at least during non-use to reduce friction and heat generation when said ribs are rigid. When the outer cutting element is pressed against the skin or at least contacts the skin during operation of the shaver/trimmer, it may deflect and at least then closely fits onto the inner cutting element. When flexible ribs are used, said gap, without accommodating a blade therein, may be zero or at least smaller than said blade thickness to provide for some biasing. Although the sandwiched cutting element may move relative to the other cutting element without friction or at very low friction, it is nevertheless prevented from deflection even when the thickness of the sandwiched cutting element is very small.

To achieve low friction and avoid clamping of hairs between the cutting teeth at the same time, said gap from the tip portions of the supporting ribs to the outer cutting element may have a thickness which is larger than the thickness of the sandwiched cutting element only by an amount smaller than the thickness of hair to be cut.

More particularly, the amount by which the width of said gap exceeds the thickness of the sandwiched cutting element may be less than 40 μm. For example, it may range from 20 μm to 40 μm. Such configuration is a good compromise between still easy manufacturing and sufficiently small risk of pulling and tugging hair to be cut.

Said skin contact/facing surface defined by the outer cutting element may be substantially plane or flat. In the alternative, said skin contact surface defined by the outer cutting element may be slightly convex or slightly dome-shaped when viewed in a cross section taken perpendicular to the reciprocating direction. When viewed in a cross sectional plane parallel to said axis of reciprocation, the skin contact surface may be linear. Thus, the skin contact surface may be slightly, smoothly convex in terms of a shallow chute-like or trough-like shape.

Both the outer cutting element and the inner cutting element may have such shape corresponding to the skin contact surface.

So as to keep the inner and outer cutting elements snugly fitting onto each other in the region where the cutting perforations are formed, it may be helpful when the rigid or flexible support ribs, with their support edge, extend directly adjacent to or closely neighboring an outer boundary of the field of perforations. The support ribs, with their support edges, may contact the inner cutting element immediately along the outermost rows of perforations.

In the alternative, said support edge of the support ribs may contact the inner cutting element along a line spaced apart from the outermost rows of perforations. Nevertheless, the support edges of the support ribs may be positioned closer to the outermost rows of perforations then to the cutting teeth at the opposite edges of the cutting elements. More particularly, the distance of the support edges of the support ribs from the field of perforations may be less than ⅓ or less than ¼ of the distance of the support edges from the comb-like cutting teeth.

So as to take up the skin contact pressure induced in the inner cutting element via the outer cutting element in a balanced way, the support edges of the support ribs facing the inner cutting element may be spaced from each other at a distance ranging from 35% to 70% or 40% to 60% of the distance defined between the rows of comb-like teeth at the opposite edges of the cutting elements. Depending on the user's preference, different portions of the skin contact surface defined by the outer cutting element may be pressed against the skin with varying forces so that varying skin pressure may arise. So as to balance such varying pressures, it is helpful when the inner cutting element is supported by said rigid support ribs at about ⅓ and about ⅔ of the span width of the inner cutting element when considering a cross sectional view thereof.

Said support ribs and/or their supporting edges contacting the inner cutting element may extend parallel to the axis of reciprocation and/or parallel to the rows of comb-like teeth at the opposite edges of the cutting elements.

The support ribs may be anchored at the base portion of the support structure in different ways. For example, the support ribs may be welded to said base portion or embedded in the material of said base portion. For example, when there are separate support ribs, each of the ribs may be inserted into a slot-like recess in said base portion to hold the support ribs in the desired orientation and position.

In the alternative, the support ribs inclined to each other at an acute angle, may be connected to each other in one piece and/or form integral parts of a support rib element. More particularly, the support ribs may be formed by V-like or dog-eared limbs of a support frame insert that can be inserted into the support structure supporting the cutting elements and/or attached to the base portion of such support structure. Such support rib insert may have a chute-like or trough-like configuration including a strip-like bottom portion from which the two support ribs extend at the described inclination. Such chute-like insert can be inserted into the support structure and fixedly attached to the base portion thereof. For example, the bottom portion of the insert may be seated onto the inner surface of a bottom portion of the outer support frame at a center portion thereof, wherein the central bottom portion of the outer support frame may form a seat for the support rib insert. Seating the support rib insert onto the bottom portion of the outer support frame may take up the support forces and pressure induced into the support ribs, thereby pressing the support rib insert onto the bottom portion of the outer support frame.

Said inner support frame insert may be fixedly attached to the outer support frame, e.g. glued and/or welded and/or form-fitted thereto.

Said outer support frame portions holding the outer cutting element at opposite edge portions thereof, together with the outer cutting element may define a cutter head chamber which may be configured tube-like or barrel-like with open or closed end faces. So as to allow hair dust or cut hair stubbles to be discharged from such cutter head chamber, the axial end sides of said cutter head chamber may be open.

More particularly, such cutter head chamber defined by the outer frame portions and the outer cutting element may be divided into a plurality of sub-chambers by the aforementioned support ribs of the inner support frame. More particularly, the cutter head chamber may be divided by the rigid support ribs into an inner sub-chamber for collecting short hair particles from the cutting perforations and a pair of outer sub-chambers for collecting long hair particles cut by the comb-like cutting teeth.

The hair dust collected in the inner sub-chamber and coming from the perforations as well as the cut hair stubbles collected in the outer sub-chambers may be discharged from the respective subchambers via at least one open end face, wherein each of opposite ends of said subchambers may be open to enhance cleaning of said subchambers and discharging collecting hair dust therefrom.

The sandwiched cutting element may be driven by a driver which is connected to the inner cutting element and coupled to a drive train transmitting a driving action of a drive unit, wherein the aforementioned inner support frame including the rigid support ribs and the outer support frame including the outer frame portions holding the outer cutting element and the base portion backing the inner support frame, may include one or more central, elongated or slit-like throughholes in which a portion of said driver and/or said drive train is slidably received. In other words, the driver and/or drive train extends through said throughhole in the inner and outer support frames and is slidably received therein to allow for reciprocating of the driver and thus, the sandwiched cutting element relative to the other cutting element.

The driver may include an elongated rod-like portion attached to opposite end portions of the inner cutting element and accommodated in the inner sub-chamber defined between the rigid support ribs and the inner cutting element.

The sandwiched cutting element may be the driven cutting element which may reciprocate or rotate, depending of the type of drive.

Basically, each of the cooperating cutting elements may be driven. However, to combine an easy drive system with safe and soft cutting action, the upper or outer cutting element having the skin contact surface may be standing and/or may be not reciprocating and not rotating, whereas the lower or inner cutting element which may be the sandwiched cutting element, may reciprocate or rotatorily oscillate.

Figure 2:
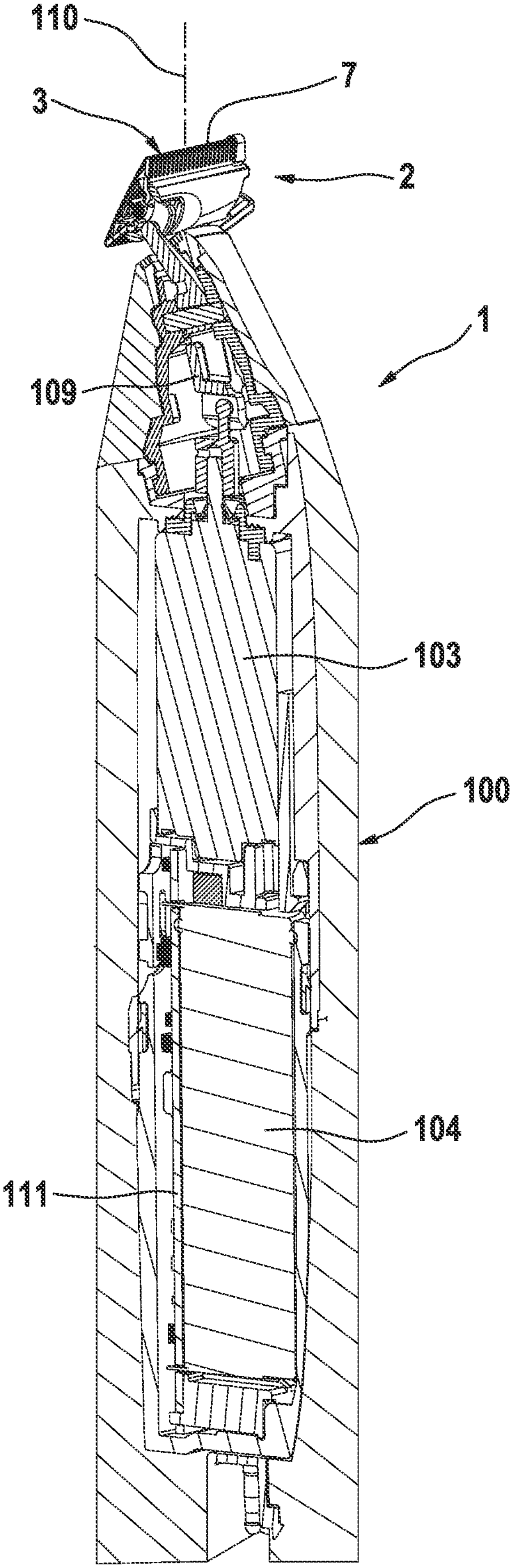
FIG. 2: a cross sectional view of the beard trimmer/shaver showing the cooperating comb-like cutting elements and the drive system for driving said cutting elements.

As can be seen from FIGS. 1 and 2, the cutter system 3 may be part of a cutter head 2 which may be attached to a handle 100 of a shaver and/or trimmer 1. More particularly, the shaver and/or trimmer 1 may include an elongated handle or handle housing 100 accommodating the battery 104, the electronic and/or electric components such as a control unit 111, an electric drive motor 103 or a magnetic drive motor and a drive train 109 for transmitting the driving action of the motor to the cutter system at the cutter head 2 which cutter head 2 may be positioned at one—the upper—end of the elongated handle 100, cf. FIG. 2. The handle housing 100 has a lower end with an socket opening for connecting same with a plug form an AC/DC source. Thus said handle 100 comprises a elongate housing which extends from a lower end to an upper end and wherein said pivot axis holder 41 is provided on top of the upper housing end and is at least partly uncovered by the handle housing.

The cutter system 3 including a pair of cooperating cutting elements 4 and 5 may be the only cutter system of the cutter head 2 as it is the case with the example shown in FIG. 1. On the other hand, the cutter system 3 may be incorporated into a shaver head 2 having other cutter systems such as shear foil cutters, wherein, for example, the cutter system 3 having at least one row of cooperating cutting teeth 6, 7 may be positioned between a pair of shear foil cutters, or, in the alternative, may be positioned in front of such a shear foil cutter.

As shown by FIG. 1, the cutter system 3 may include elongated rows of cutting teeth 6 and 7 which may reciprocate relative to each other along a linear path so as to effect the cutting action by closing the gaps between the teeth and passing over each other. On the other hand, the cutter system 3 also may include cutting teeth 6 and 7 which are aligned along a circle and/or are arranged radially. Such rotatory cutting elements 4 and 5 may have cutting teeth 6 and 7 projecting substantially radially, wherein the cutting elements 4 and 5 may be driven to rotate relative to each other and/or to rotatorily oscillate relative to each other. The cutting action is basically similar to reciprocating cutting elements as the radially extending teeth, when rotating and/or rotatorily oscillating, cyclically close and reopen the gap between neighboring teeth and pass over each other like a scissor.

As shown by FIG. 2, the drive system may include a motor the shaft of which may rotate an eccentric drive pin which is received between the channel-like contours of a driver 18 which is connected to one of the cutting elements 4 which is caused to reciprocate due to the engagement of the rotating eccentric drive pin with the contours of said driver 18.

Figure 3:
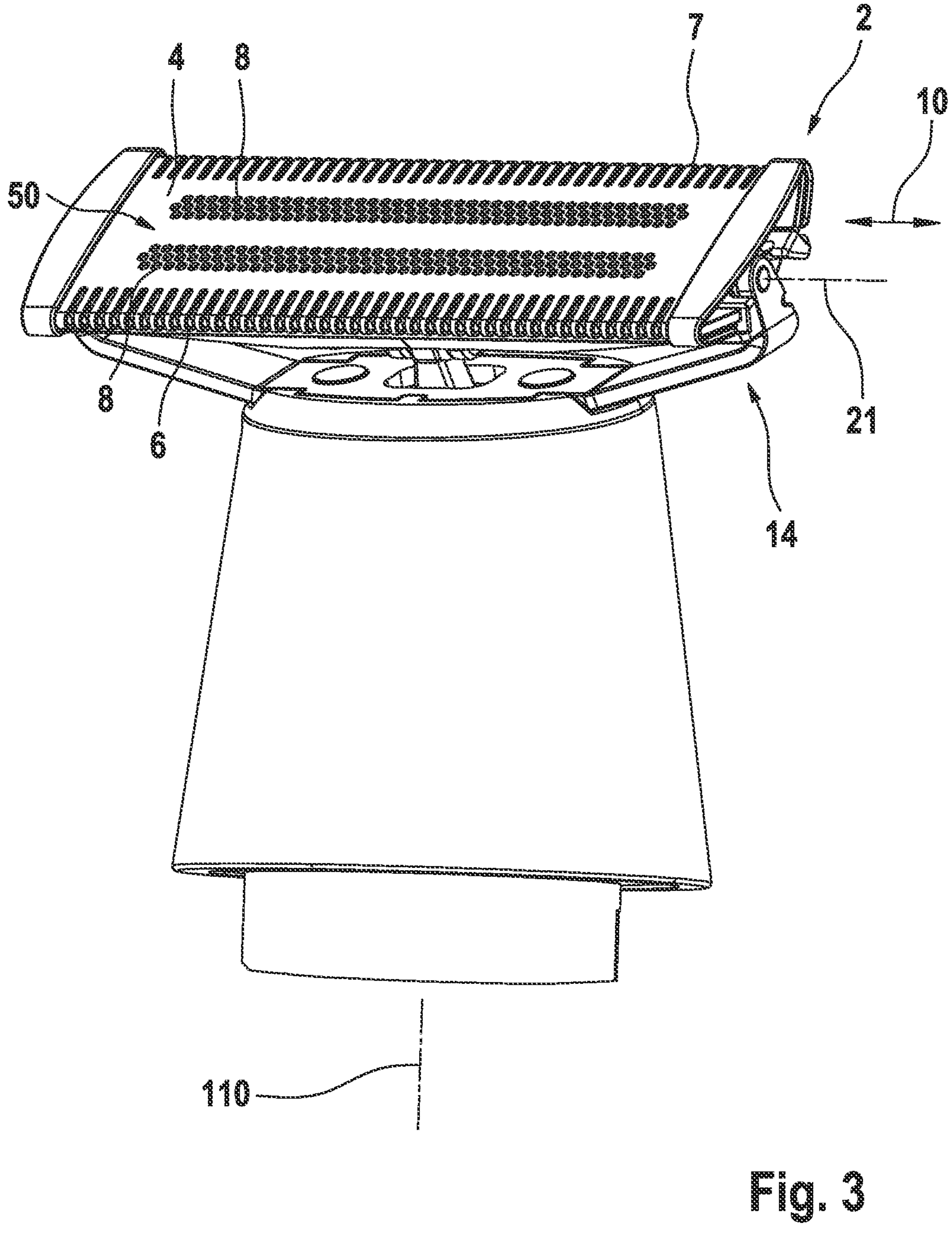
FIG. 3: a perspective view of the cutter system including the pair of cooperating comb-like cutting elements and the support structure for supporting the cutting elements relative to each other.
Figure 4A:
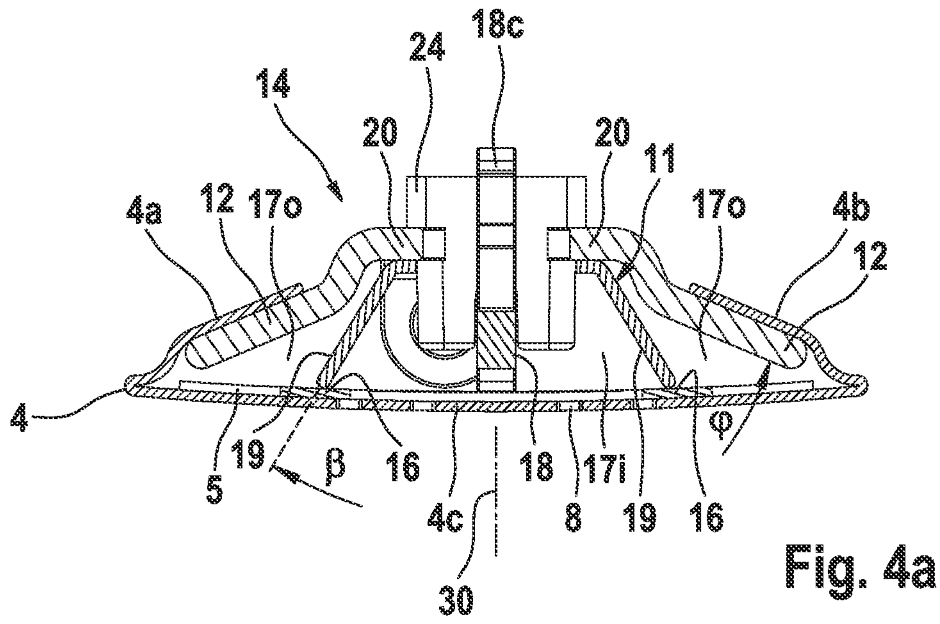
FIG. 4*a*-4*b*: a cross sectional view of the cutter system and the support structure, wherein the C-shaped outer cutting element is shown to be bent or curved around outer frame portions and an inner cutting element is shown to be supported by a V-shaped inner support frame forming rigid support ribs extending from a base portion of the support structure at a steeper angle then said outer frame portions, wherein partial view (a) shows rigid support ribs whereas view (b) shows flexible, spring-like support ribs.
Figure 4B:
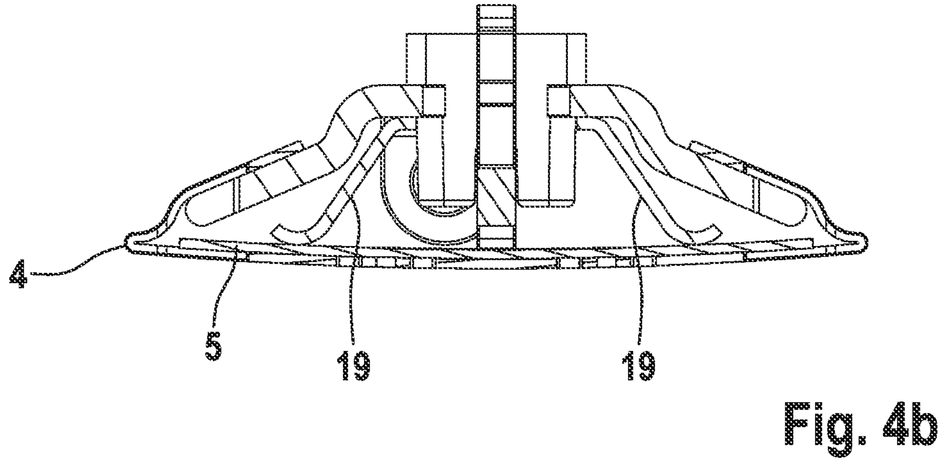
Figure 5A:
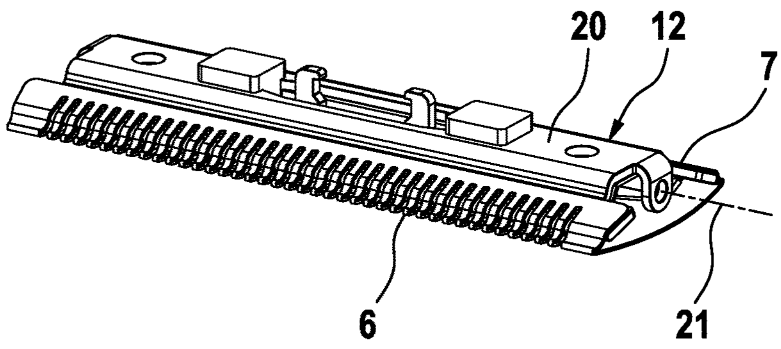
FIG. 5*a*: a perspective view of the elements of the cutter system including the outer and inner cutting elements, an outer support frame for holding the outer cutting element, a chute-shaped or trough-shaped inner support frame including rigid support ribs for supporting the inner cutting element, a driving element for reciprocating the inner cutting element and guide blocks for guiding the reciprocating driving element.
Figure 5B:
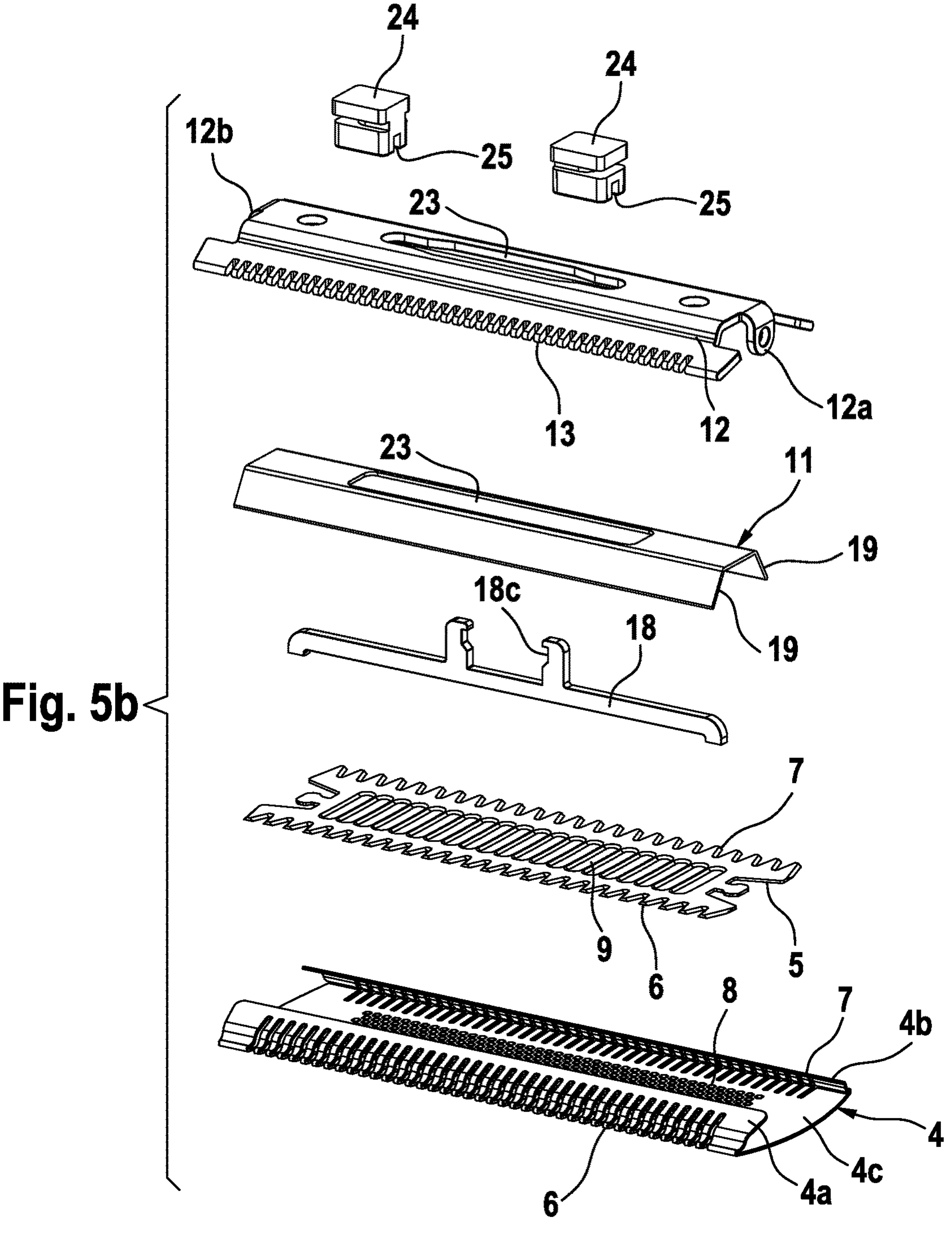
FIG. 5*b*: an exploded perspective view of the elements of the cutter system based on FIG. 5*a* including the outer and inner cutting elements, an outer support frame for holding the outer cutting element, a chute-shaped or trough-shaped inner support frame including rigid support ribs for supporting the inner cutting element, a driving element for reciprocating the inner cutting element and guide blocks for guiding the reciprocating driving element.

As shown by FIGS. 3, **4*a* and 4*b*, and 5, the cooperating cutting elements 4 and 5 basically may have—at least roughly—a plate-shaped configuration, wherein each cutting element 4 and 5 includes two rows of cutting teeth 6 and 7 which may be arranged at opposite longitudinal sides of the plate-like cutting elements 4 and 5, cf. FIGS. 4***a* and 4*b* and FIGS. 5*a* and 5*b*. The cutting elements 4 and 5 are supported and positioned with their flat sides lying onto one another. More particularly, the cutting teeth 6 and 7 of the cutting elements 4 and 5 touch each other back to back like the blades of a scissor.

In addition to such comb-like cutting teeth 6 and 7, the cooperating cutting elements 4 and 5 may be provided with at least one field of cutting perforations arranged between the rows of cutting teeth 6 and 7 in a middle portion of the cutting elements 4 and 5. More particularly, the outer cutting element 4 defining a skin contact surface of the cutter system 3 may include at least two rows of perforations 8 which may be formed as small sized throughholes having a circular, oval, elliptical or polygonal shape.

In particular, such small sized throughholes forming the perforations 8 may have a hexagonal shape, wherein the long axis of such hexagonal throughholes, i.e. the axis going through opposite corners of the hexagonal shape, may be oriented transverse to the reciprocating axis 10 of the cutting elements 4 and 5.

Figure 9:
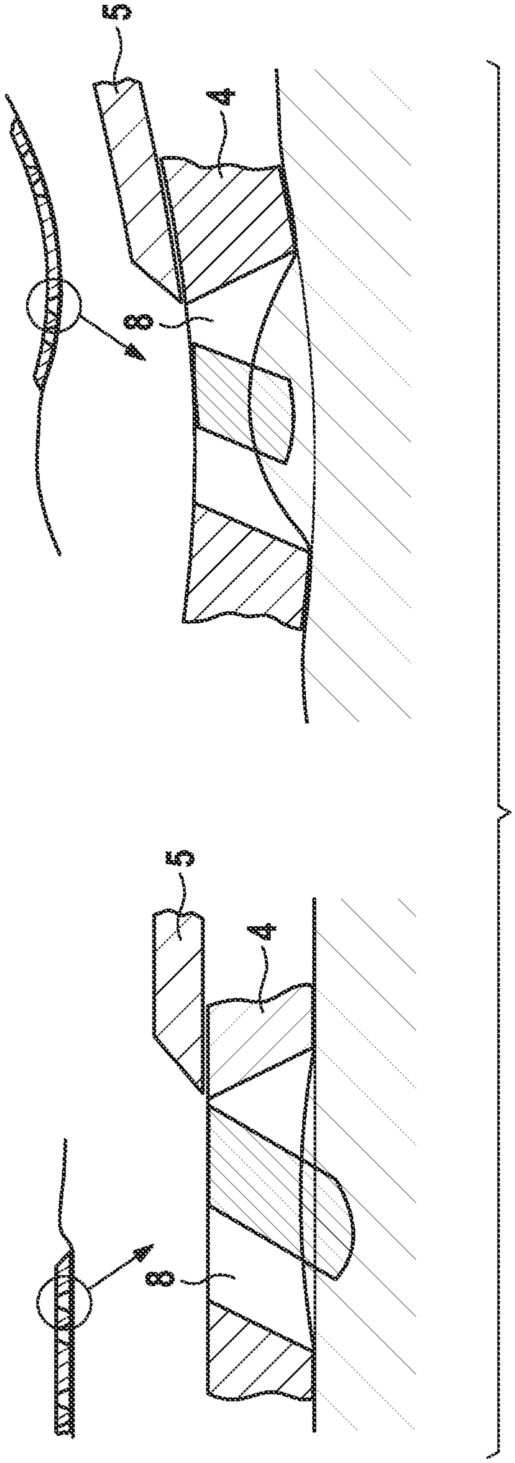
FIG. 9: a cross-sectional view of perforations having a conical or non-cylindrical contour expanding towards the skin contact surface for helping hair entering the perforation with left side views (small and enlarged) for planar cutting elements and right side views (small and enlarged) for doom/convex curved shaped cutting elements.

As can be seen from FIG. 9, the perforations 8 may expand towards the skin contact/facing surface, i.e. the cross sectional area of the perforation 8 becomes larger towards the skin contact surface. Such trumpet-like or conical or truncated pyramid-like shape helps hair to enter the perforations, as can be seen from FIG. 9.

Figure 8:
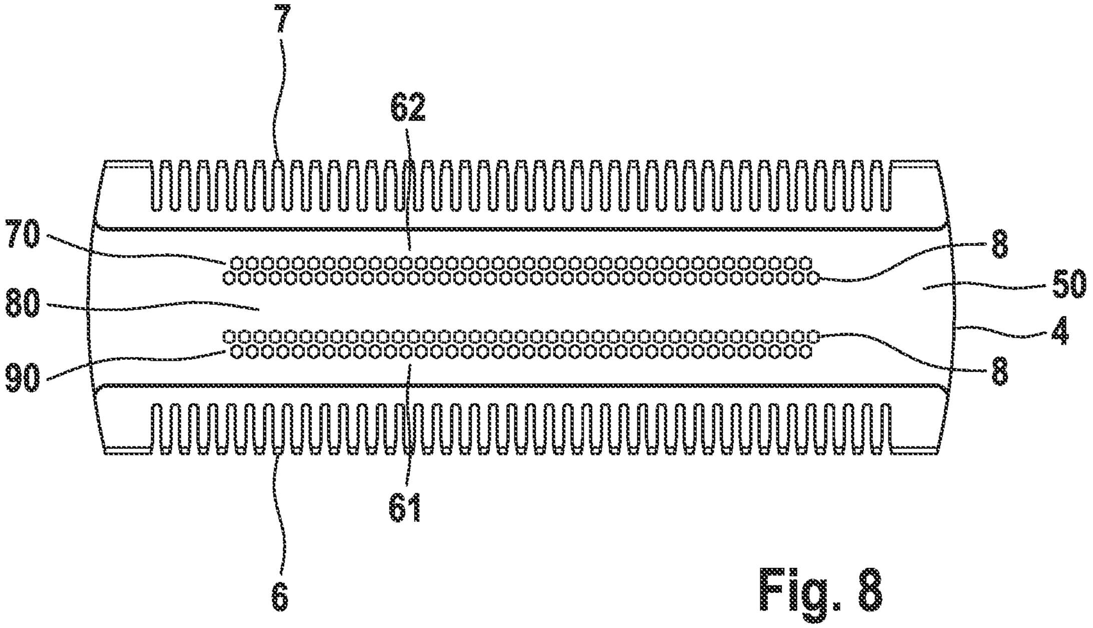
FIG. 8: a plain view of the outer cutting element showing the separate fields of perforations thereof.

As can be seen from FIG. 8, the perforations 8 may not be distributed all over the center section of the skin contact surface, but are arranged in limited areas only. More particularly, the cutting perforations 8 for cutting short hair may be restricted to areas 70, 90 of the skin contact surface or skin facing surface 50 of the cutting element 4 following the comb-like cutting teeth 6, 7 when the cutter system 3 is moved along the skin to be shaved with one of the rows of comb-like teeth 6, 7 moving ahead, whereas a middle portion 80 of the skin contact/facing surface defined by the cutting elements in-between said opposite rows of comb-like teeth may be unperforated.

Such arrangement of restricted areas 70, 90 of perforations 8 spaced apart from each other takes into account that very short hair is cut by the perforations 8 immediately following the leading one of the rake-like cutting edges, whereas the perforations further away from the leading comb-like cutting edge are less effective in cutting very short hairs. Due to the elimination of perforations in areas of the skin contact surface 50 less effective in cutting very short hairs reduces the friction between the cutting elements 4, 5 without sacrificing efficiency in cutting very short hairs. Friction is reduced as less cutting edges of less perforations need to pass each other when the cutting elements move relative to each other and, thus, hair particles already cut or hair dust coming from the cutting perforations moving ahead over the skin to be shaved is not cut or grinded once again so frictional losses are reduced.

More particularly, the cutting perforations 8 may be arranged in two separated elongated fields 70, 90 of perforations which are separated from each other by an elongated unperforated center section 80 of an outer one of said cutting elements 4 defining a skin contact surface 50, and which include each at least two rows of perforations 8 extending along and/or parallel to the rows of comb-like cutting teeth 6, 7.

So as to allow for sufficient support of the cutting elements moving relative to each other without interfering with the cutting action of the comb-like teeth 6, 7 and perforations 8, said fields of perforations 70, 90 also may be separated from or spaced apart from the rows of comb-like teeth 6, 7 by elongated, unperforated side sections 61, 62 of said outer cutting element, wherein the support structure may include a pair of flexible or rigid support ribs 19 supporting an inner one of said cutting elements 5 under said unperforated side sections 61, 62 adjacent to or along outer boundaries of said fields of perforations 70, 90. Said support structure is made from metal but and may optionally include a plastic cover to the outside.

So as to reduce friction due to engagement of the support structure 14 with the moving cutting element 5, the inner cutting element 5 may extend unsupported under said unperforated center section 80 between said fields 70, 90 of perforations 8.

Said elongated unperforated center section 80 of the skin contact surface 50 defined by the outer cutting element may have a size or width which is larger than a size or width of each of said fields 70, 90 of perforations. More particularly, the unperforated center section of the skin contact surface may extend over an area ranging from 100%-250% or from 110% to 175% of the area defined by each of said fields of perforations, cf. FIG. 8.

More generally, more than ⅔ or more than ¾ of the area of the skin contact surface 50 of the cutter element 4 between the comb-like cutting teeth may be unperforated. In other words, only ¼-⅔ of the skin contact surface 50 between the opposite rake-like toothed edges of the cutter system 3 may be perforated, as it is shown by FIG. 8. Such limitation of the area of perforations 8 may significantly reduce the friction when the cutting elements 4, 5 move relative to each other.

Such perforations 8 in the outer cutter element 4 may cooperate with perforations 9 in the inner cutting element 5 when said cutting elements 4 and 5 reciprocate relative to each other along the axis of reciprocating 10. Said perforations 9 in the inner cutting element 5 also may be formed as small sized throughholes of a shape corresponding to or differing from the shape of the perforations 8 in the outer cutting element 4. However, as can be seen from FIG. 5, the perforations 9 in the inner cutting element 5 do not need to be small sized throughholes, but may be larger sized cutouts each cooperating with more than one perforations 8 in the other cutting element 4. More particularly, the perforations 9 in the inner cutting element 5 may be formed as longitudinal, slot-like cutouts extending, with their longitudinal axis, transverse to the axis of reciprocation 10. Thus, each elongated transverse perforation 9 in the inner cutting element 5 may cooperate with each row of perforations in the outer cutting element 4.

Said cutouts in the inner cutting element 5 overlap with the perforations 8 in the outer cutting element 4 and, depending on the reciprocating action, close said perforations 8 to effect a shearing action and/or cutting-off of hairs introduced into the perforations 8 and 9.

So as to support the cutting elements 4 and 5 in the aforementioned position lying and/or seated onto each other back-to-back, but still allowing reciprocating movement of the cutting teeth 6 and 7 and the perforations 8 and 9 relative to each other, the inner cutting element 5 is sandwiched between the outer cutting element 4 and a support structure 14 which includes an inner frame supporting the inner cutting element 5 and an outer frame 12 holding the outer cutting element 4.

More particularly, said support structure 14 may define a gap 16 in which the inner cutting element 5 may move relative to the outer cutting element 4, wherein the inner cutting element 5 is slidably guided in said gap 16.

More particularly, as can be seen from FIGS. 4*a* and 5, the outer cutting element 4, when viewed in a cross section, may have a substantially C-shaped configuration with edge portions 4*a* and 4*b* which are bent away or curved away from the skin contact surface and form holding flanges attached to or fixed to said outer frame portions 12 of the support structure 14. Said edge portions 4*a* and 4*b* may be folded back or bent around the edge portions of said outer frame 12, as it can be seen from FIG. 4*a*. However, in the alternative, it also would be possible to seat said holding flanges 4*a* and 4*b* of the cutting element 4 onto the inner side of said outer frame 12.

The cutting element 4 may be rigidly or fixedly fastened to said outer frame portions 12. For example, the cutting element 4 may be welded or glued to the outer frame 12.

As can be seen from FIGS. 4*a* and 5, said outer frame portion 12 of the support structure 14 may include a pair of diverging legs forming a shallow chute or trough, wherein the edge portions of said support legs of the outer frame 12 may be provided with slot-like cutouts 13 forming a toothed edge basically corresponding to the cutting teeth 6 and 7 of the cutting elements 4 and 5. More particularly, said cutouts 13 in the edges of the outer frame 12 allow hair to be cut to enter into the teeth 6 and 7 of the cutting elements 4 and 5, but at the same time provide for support to the cutting teeth 6 of the outer cutting element 4 to some extent.

The cutting teeth 6 of the outer cutting element 4 may be formed in the transitional region between the folded back support flanges 4*a* and 4*b* and the front side of the cutting element 4 defining the skin contact surface of the cutter system 3.

Said outer cutting element 4 may form a C-shaped, plate-like cutting element the edges of which are dog-eared to form limbs bent inwardly like the limbs of a C or a U, wherein such dog-eared limbs 4*a* and 4*b* are held by said outer support frame portions 12. The transitional edge portion connecting the dog-eared limbs with the central portion of the outer cutting element is contoured or configured to form a row of comb-like teeth 6 for cutting longer stubbles, whereas the central portion 4*c* of the cutting element 4 is provided with said field of perforations 8 for cutting short hair.

As can be seen from FIG. 4*a*, the outer cutting element 4, together with the outer frame 12 of the support structure 14, defines a chamber 17 which is surrounded by the outer cutting element 4 and the outer frame 12.

Within such chamber 17, the inner frame 11 for supporting the inner cutting element 5 is arranged. Said inner frame 11 includes at least one pair of rigid support ribs 19 which extend from a base section 20 of the support structure 14 towards the inner cutting element 5 lying, back to back, onto the outer cutting element 4.

More particularly, as can be seen from FIGS. 4*a* and 4*b*, said rigid support ribs 19 originate from a center section of the outer frame 12 where the diverging support legs of the outer frame 12 join each other. Said support ribs 19 of the inner frame 11 extend from said base section 20 towards the inner cutting element 5 at an angle β which is considerably steeper than the angle φ between the outer frame 12. As can be seen from FIG. 4*a*, the support ribs 19 of the inner frame 11 may define an angle β from 2×20° to 2×40° or 2×25° to 2×30° between each other, wherein said rigid support ribs 19 may be arranged symmetrical with regard to a center plane going perpendicular to the skin contact surface and parallel to the axis of reciprocation 10.

So as to give the rigid support ribs 19 sufficient rigidity, said ribs 19 may have a straight longitudinal axis when viewed in a cross sectional view as it is shown in FIG. 4*a*. In other words, the inner and outer surfaces of the support ribs 19 may be plane and flat so as to achieve buckling stiffness. These support ribs 19 may define a V-shaped configuration originating from the base portion 20.

In the alternative, said ribs 19 may be configured flexible and/or elastically so as to bias inner the cutting element 5 onto the outer cutting element 4, as shown by FIG. 4*b*. For example, the ribs 19 may have a flexing, curved contour when viewed in cross-section, cf. FIG. 4*b*, so as to elastically urge the cutting element 5 against the other cutting element 4.

As can be seen from FIGS. 5*a* and 5*b*, the support ribs 19 may be part of a supporting insert and/or formed in one piece with each other. More particularly, the inner frame 11 may have a chute-like or trough-like configuration including a strip-like bottom portion from the edges of which said pair of support ribs 19 extends. For example, said inner frame 11 including the support ribs 19 may be formed from a substantially rectangular metal plate, wherein strip-like edge portions may be bent relative to a middle-section so as to form the inclined support ribs 19.

Said inner frame 11 may form an insert that can be inserted into the chamber 17 defined by the outer frame 12 and the outer cutting element 4. More particularly, said insert forming the inner frame 11 may be seated onto the base portion 20 of the outer frame 12 which base section 20 takes up the forces and pressure induced into the inner frame 11 when the cutter system 3 is pressed against skin to be shaved.

The inner frame 11 is configured such that the aforementioned gap 16 is defined between the support edges of the rigid support ribs 19 on the one hand and the inner side of the outer cutting element 4 on the other hand. More particularly, the height of the support ribs 19 is configured such that said gap 16 between the support edges of the ribs 19 and the outer cutting element 4 substantially corresponds to the thickness of the inner cutting element 5, wherein the gap 16 may be configured to be slightly wider than the thickness of the plate-like cutting element 5 so as to reduce friction and to provide some play between the inner cutting element 5 and the support ribs 19 and the inner cutting element 5 and the outer cutting element 4. Such play may be given when the cutter system 3 is unloaded, i.e. not pressed against a skin to be shaved. In the operational state, when the outer cutting element 4 is pressed against the skin to be shaved, such play is eliminated and the cutting elements 4 and 5 are snuggly fitted onto each other to achieve smooth cutting of hair.

Despite such possible play provided by the support structure 14, the support ribs 19 are configured such that the gap 16, in its width, exceeds the thickness of the inner cutting element 4 by an amount which is smaller than the thickness of hair to be cut. For example, the width of the gap 16 may be larger than the thickness of the sandwiched cutting element 5 by an amount smaller than 40 μm or ranging from 20 μm to 40 μm.

As can be seen from FIG. 4*a*, the inner and outer cutting elements 4 and 5 may have a slightly convex contour. More particularly, the skin contact surface defined by the outer cutting element 4 may have a slightly convex, substantially chute-like configuration. When viewed in a cross section taken perpendicular to the axis of reciprocation 10, the outer surface of the outer cutting element 4 may be slightly dome-shaped, cf. FIG. 4*a*.

The inner cutting element 5 substantially corresponds to the shape of the outer cutting element 4 in terms of said slightly convex chute-like shape.

As can be seen from FIGS. 4*a* and 4*b*, the support edges of the support ribs 19 facing the inner cutting element 5 may be spaced from each other at a distance ranging from about 35% to 70% or 40% to 60% of the distance defined between the rows of comb-like teeth 6 and 7 at the opposite edges of the outer cutting element 4. Thus, the rigid support ribs 19 may support the inner cutting element 4 at about ⅓ and about ⅔ of its span width, when viewed in a cross-section perpendicular to the axis of reciprocation 10. More particularly, the support edges of the ribs 19 may extend directly adjacent to the outer boundaries of the field of perforations 8, wherein said support ribs 19 may contact the inner cutting element 5 along the outer longitudinal contour of the cutouts forming the perforations 9 in the inner cutter element 5.

Due to the configuration of the support ribs 19 extending from the base portion 20 of the support structure 14 at an angle steeper than the support legs of the outer frame 12, the chamber 17 defined by the outer frame 12 and the outer cutting element 4 attached thereto, is divided by said support ribs 19 into an inner sub-chamber 17*i* and a pair of outer sub-chambers 17*o*, cf. FIG. 4*a*, wherein the outer sub-chambers 17*o* together may have a volume substantially corresponding to the volume of the inner sub-chamber 17*i*.

The rigid support ribs 19 of the inner frame 11 may extend substantially parallel to the axis of reciprocation 10. More particularly, the support edges of the ribs 19 contacting the inner cutting element 5 may extend parallel to the axis of reciprocation 10.

Figure 6:
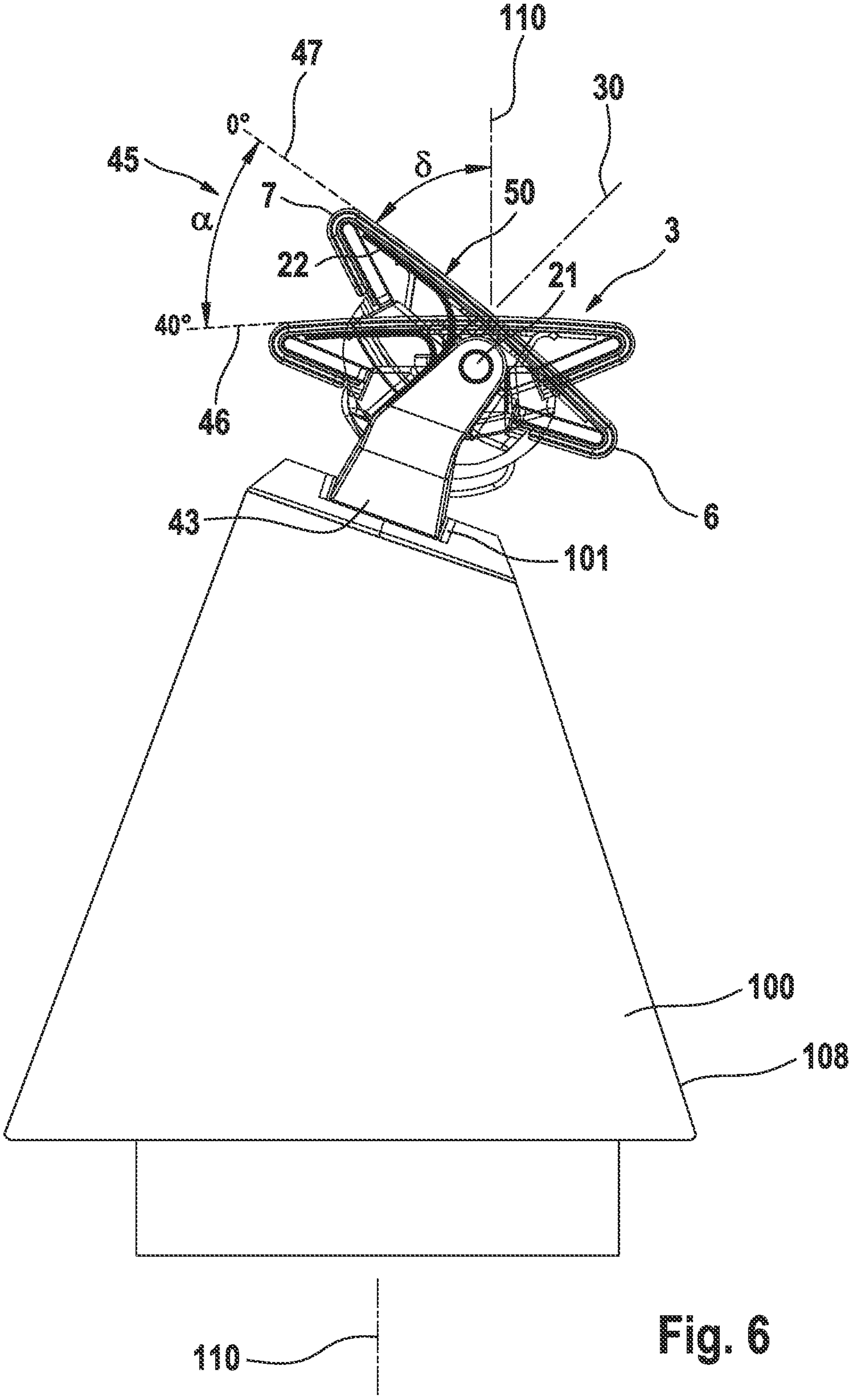
FIG. 6: a side view showing the pivoting of the cutter system relative to the handle of the shaver/trimmer as allowed by the support structure.
Figure 7:
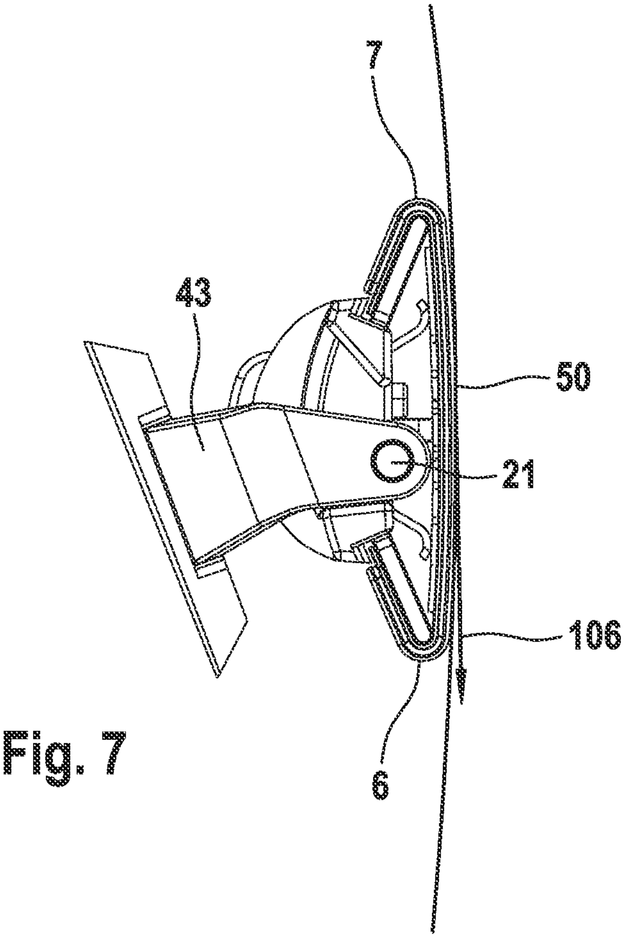
FIG. 7: a side view showing the cutter system pivoting about its pivot axis when following the skin contour.

As can be seen from FIGS. 6 and 7, the cutter head 2 including the cutter system 3 may be pivotably supported relative to the handle of the shaver/trimmer 1 about a pivot axis 21 which may extend substantially parallel to the axis of reciprocation 10.

Said pivot axis 21 may be positioned close to the cutting elements 4 and 5 and/or within the chamber 17 surrounded by the outer cutting element 4 and the outer frame 12. As can be seen from FIGS. 5 and 6, the outer frame 12 of the support structure 14 holding the outer cutting element 4 may include a pair of pivot bearing sections 12*a* and 12*b* which may be spaced from each other and/or positioned at the opposite end faces of the outer frame 12. On the other hand, a pair of support flanges may be provided at the cutter head side of the handle 100, wherein said pivot bearing flanges may be rotatably connected to said pivot bearing sections 12*a* and 12*b* of the outer frame 12 to form the pivot axis 21.

More particularly, so as to avoid too much flexibility detrimental to efficient transmission of driving forces and/or torque to the cutting elements, said pivot axis 21 may have a fixed position relative to a non-reciprocating one of said cutting elements 4 and/or a fixed position relative to a handle 100 of the shaver/trimmer 1. Such fixed pivot axis position allows to avoid yielding and bulky bar-linkage mechanisms.

Figure 10A:
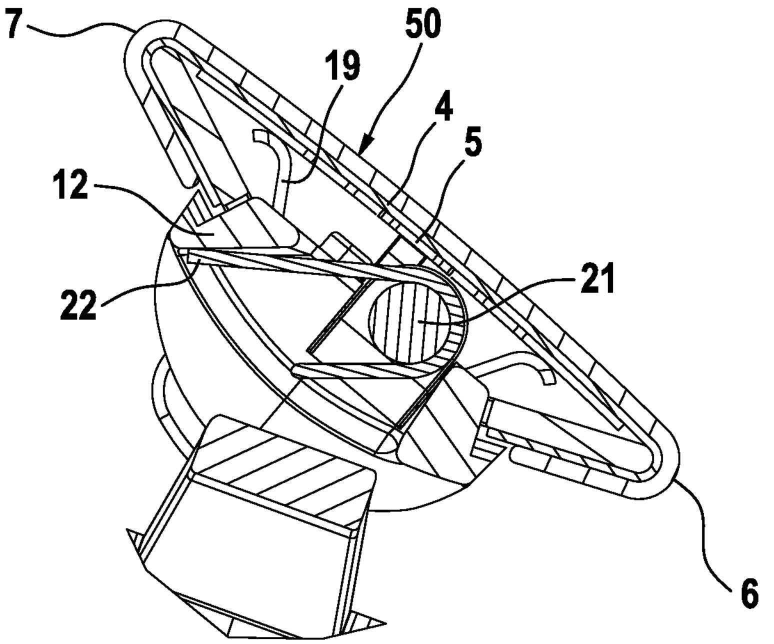
FIG. 10*a*: a cross sectional view of the pivot bearing structure providing for the pivot axis for the cutting elements.
Figure 10B:
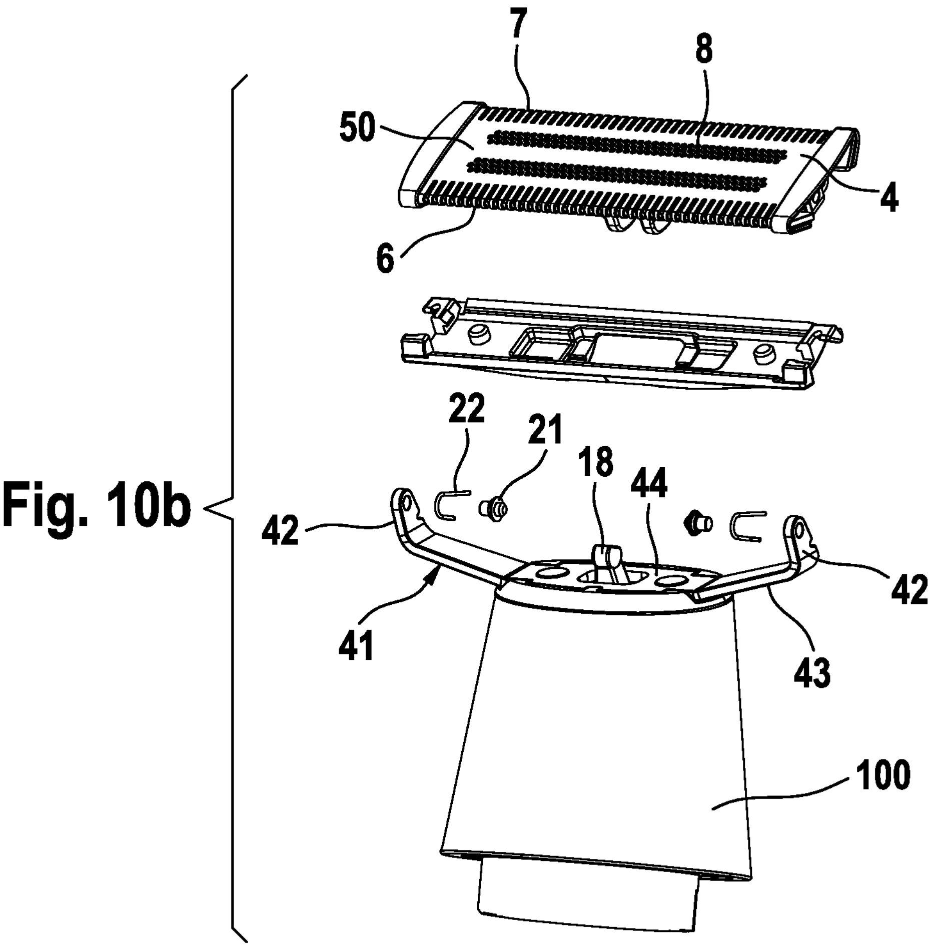
FIG. 10*b*: an exploded perspective view of the pivot bearing structure as of FIG. 10*a* providing for the pivot axis for the cutting elements.

Said support structure 14 may include a rigid pivot axis holder 41 having a mounting portion 44 for fixedly attaching the pivot axis holder 41 to the handle 100 or a chassis portion 101 of the shaver/trimmer 1, wherein said pivot axis holder 41 may include two frame portions 42 extending into or towards a cutter head chamber 17 defined by said cutting elements 4, 5 and the outer frame portions 12 of the support structure 14 holding opposite edges of the outer cutting element 4, as it is shown by FIGS. 10*a* and 10*b*.

More particularly, said pivot axis holder 41 may include a U-shaped or V-shaped holding frame element 43 made from metal, cf. FIGS. 10*a* and 10*b*. The pivot axis holder 41 is connected with an upper end of the handle and—aside of the connection area with the handle and the connection area with the cutting elements—uncovered by a housing part and thus visible for the user of the assembled device.

More particularly, said pivot axis holder 41 may include a U-shaped or V-shaped holding frame element 43 made from metal, cf. FIG. 10. The pivot axis holder 41 is connected with an upper end of the handle and—aside of the connection area with the handle and the connection area with the cutting elements—uncovered by a housing part and thus visible for the user of the assembled device.

A spring device 22 may be associated with said pivot axis 21 so as to urge the cutter head 2 in a desired, mutual pivot position or orientation which may be a middle orientation allowing pivoting into opposite directions or, in the alternative, an end position or end orientation allowing pivoting into one direction only.

Said spring device 22 may be engaged with the support flanges 43 of the pivot axis holder 41 attached to the handle 100 on the one hand and the outer frame 12 of the support structure 14 on the other hand.

More particularly, said pivot axis 21 is not arranged symmetrically with respect to the opposite rake-like cutting edges for cutting longer hairs so pivoting the cutting elements 4, 5 about said pivot axis 21 causes smaller movements of one of said rake-like cutting edges in comparison to the other rake-like cutting edge. More particularly, said pivot axis 21 is positioned offset from a middle plane 30 which extends perpendicular to the center section 80 of the skin contact/facing surface 50 of the cutter elements 4, 5 so that said pivot axis 21 is closer to a first one of said rows of comb-like cutting teeth 6 than to a second one of said rows of comb-like cutting teeth 7. When pivoting, the row closer to the pivot axis 21 makes a shorter transverse movement, whereas the row further away from the pivot axis 21 makes a longer transverse movement, wherein such transverse movements follow a circular path around said pivot axis 21, wherein the length of the movement depends on the distance of said rows of teeth from the pivot axis 21.

More particularly, the pivot axis 21 may be arranged closer to the row of comb-like cutting teeth 6 which is usually used as a leading edge going ahead when moving the cutter system 3 along the skin to be shaved. Such common moving direction 106 intuitively preferred by a majority of users may depend on, inter alia, the inclination of the skin contact/facing surface of the cutter system 3 relative to the handle 100 in a home position of the cutting elements 4, 5 relative to said pivot axis 21. Alternatively, or in addition the preferred movement direction 106 by a majority of users may be towards the on/off button 105 of the handle.

As can be seen from FIG. 6, in a home position or neutral position or initial position, in which said cutting elements 4,5 are kept without external forces caused by a user, said cutting elements 4, 5 may be inclined relative to a longitudinal handle axis 110 at an acute angle δ so that the skin contact and/or skin facing surface 50 of the cutter elements 4, 5 faces towards a front side 108 of the handle 100 of the shaper/trimmer 1. The front side 108 of the handle is the same side of the handle at which the on/off button 105 for switching the operation of the motor on/off is located and/or a location 107 at which a user's thumb may be rested. Considering such inclination of the cutting elements 4, 5 towards said front side in a home position, the pivot axis 21 is positioned closer to the row of comb-like teeth 6 positioned at said front side whereas the opposite row of comb-like cutting teeth 7 positioned at the backside of the handle 100 is further away from said pivot axis 21.

Many users pull the cutter system along the skin to be shaved with said front-side row of cutting teeth 6 forming the leading edge, as it is indicated by the arrow in FIG. 7, i.e. downwards in FIG. 7, so that positioning the pivot axis 21 closer to said front-side row of comb-like teeth 6 may improve the user's feeling of comfort and may reduce the risk of skin irritations or even skin injuries such as cuts that may be caused when the comb-like cutting teeth 6 move into the skin due to pivoting or the pitch angle towards the skin becomes too steep.

Basically, transverse movements of the leading cutting edge 6 could be completely eliminated when the pivot axis 21 would be positioned directly at said leading cutting edge since such position would eliminate the leverage arm or pivoting radius in terms of the distance from the pivot axis. However, offsetting the pivot axis 21 too much from the center of the cutter system 3 may impair comfort and safety when moving the cutter system in the opposite or non-preferred moving direction over the skin to be shaved. So as to achieve a good compromise, the pivot axis 21 may be spaced apart from said first row of comb-like teeth 6 at a distance $L_1$ which is about 60%-90% or 70%-90% or 75%-85% of the distance $L_2$ between said pivot axis and the opposite second row of comb-like teeth, cf. FIG. 6.

Thus, the pivot axis 21 may be positioned about 10-40% closer to one row of comb-like cutting teeth 6 than to the other row of comb-like cutting teeth 7.

So as to achieve good responsiveness of the pivoting of the cutting elements 4, 5 and, thus, good adaption to the skin contour for different users which may apply different levels of skin contact pressure, the pivot axis 21 may be positioned close to the skin contact surface, cf. FIG. 6, so as to reduce the torque and thus pivoting effect of friction. When the cutter system is pressed against the skin and moved along the skin, the friction caused between the skin contact surface 50 and the skin to be shaved tends to or tries to pivot the cutter system about the pivot axis 21, cf. FIG. 7, wherein the lever arm of such frictional forces becomes the smaller the closer the pivot axis 21 is to the skin contact surface 50.

More particularly, the pivot axis 21 may be positioned slightly under the skin contact surface 50 and/or within a cutter head chamber 17 encompassed by frame portions of the support structure 14 holding opposite edges of the outer, C-shaped cutting element 4 and said cutting element 4. Such position significantly reduces the leverage of frictional forces relative to the pivot axis 21 and, thus, pivoting torque caused by such frictional forces on the one hand and allows for a compact, space-saving arrangement of the support structure 14 on the other hand.

So as to allow for easy, intuitive use of the shaver/trimmer, the support structure may be configured to provide for a pivoting range 45 of the cutting elements which is asymmetrical with regard to a longitudinal handle axis 21, as it is shown by FIG. 6. In other words, the pivot range 45 may be larger towards one side of the handle 100 than towards the opposite side of the handle 100. More particularly, the pivot range 45 may be configured such that the skin contact and/or skin facing surface 50 of the cutting elements faces towards the same side of the handle over at least ⅔ or ¾ of said pivot range 45.

A natural shaver feeling and easy, intuitive use may be achieved when said pivot range allows for various pivoting positions of the cutting elements with an angle of inclination ranging from −20° to +60° or 0°-40°+/−10° or +/−5°, said angle of inclination α being defined between a virtual plane 46 extending perpendicular to the longitudinal handle axis 110 and another virtual plane 47 tangential to the skin contact/facing surface 50 of the cutting elements 4, 5.

So as to urge the cutting elements 4, 5 into their pivoting home position, the aforementioned biasing device 22 may be associated with said pivot axis 21. Such biasing device 22 may be configured to bias the cutting elements 4, 5 about said pivot axis 21 towards an end of a limited pivot range. In other words, the biasing device which may include a spring device, does not urge the cutting elements into a neutral middle position from which it may pivot into opposite directions, but the biasing device 22 tries to urge the cutting elements into an extreme pivot position or an end pivot position from which the cutting elements may pivot only in one direction.

More particularly, the biasing device 22 may be configured to bias the cutting elements 4, 5 into an angular pivoting position with a smallest possible angle of inclination δ of the skin contact surface 50 vis-à-vis the longitudinal handle axis 110. If the cutting elements pivot out of said biased home position, the plane 47 tangential to the skin contact surface 50 gets more and more transverse to the longitudinal handle axis 110 and/or tries to approach a position perpendicular to said longitudinal handle axis 110.

Due to such biased home position in which the skin contact surface 50 is inclined at a rather small angle δ relative to the longitudinal handle axis 110, users intuitively pull the cutter system 3 with the aforementioned first row of cutting teeth 6 going ahead over the skin to be shaved. Thus, the eccentric or offset pivot axis 21 allows for fine adaption of the cutting elements to the skin contour and avoids uncontrolled transverse movements potentially posing a risk of skin irritations.

Irrespective of such preferred direction of moving the cutter system, biasing the cutting elements 4, 5 into said home position at the end of the pivoting range may also reduce the risk of skin irritations or even skin injuries when the cutter system is moved over the skin to be shaved in the non-preferred opposite direction, i.e. when the second row of comb-like cutting teeth 7 is the leading edge since said second row of comb-like teeth 7 may deflect due to pivoting rather easily and gives way to the skin, wherein only very low skin contact forces are necessary at such opposite edge as the distance to the pivot axis 21 is rather large and, thus, the leverage of such skin contact forces at the opposite edge is large.

So as to drive the cutting elements 4 and 5 in a reciprocating manner relative to each other, a driver 18 may be connected to the inner cutting element 5, wherein such driver 18 may include a rod-like driving element attached to opposite end portions of the inner cutting element 5. On the other hand, said driver 18 may include a coupling section **18*c* to be coupled with a driving element extending from handle 100 to the cutter head 2. More particularly, the inner frame 11 and the outer frame 12 of the support structure 14 may include an elongated recess 23 or cutout extending through the base section 20 of the support structure 14, wherein the aforementioned coupling section 18*c* of driver 18 may extend through said elongated cutout 23, cf. FIGS. 5*a* and 5*b* and FIG. 4*a*, to allow coupling with the driving element of the drive train coming from the motor in the handle 100**.

Said driver 18 may be slidably guided at the inner frame 11 and/or outer frame 12. For example, one or more guiding blocks 24 or bearings 24 may be provided at the outer frame 12. For example, such guiding blocks 24 may be inserted into the central, elongated recess 23 extending in the base portion of the outer frame 12, wherein said guiding blocks 24 may include slot-like groves 25, in which the rod-like driver 18 may be slidably guided.

Said driver 18 may be accommodated between said rigid support ribs 19 of the inner frame 11. In particular, said driver 18 may be accommodated within the inner sub-chamber 17*i* and thus, may be surrounded by the chute-like insert forming the inner frame 11 including the rigid support ribs 19, wherein the coupling section 18*c* of the driver 18 may extend through the central, elongated recess 23 in the bottom portion of said insert forming the inner frame 11.

The invention claimed is:

1. An electric shaver or trimmer, comprising:

a cutter system having a pair of cooperating cutting elements with two rows of comb-like cutting teeth at opposite edges thereof and a skin contact surface or skin facing surface of said cutting elements, and a spring device for biasing said cutting elements about said pivot axis, wherein said cutting elements are movably supported relative to each other by a support structure, wherein said support structure comprises an outer frame comprising a pair of pivot bearing sections, wherein said pair of pivot bearing sections provide for a pivot axis about which said cooperating cutting elements are pivotable to follow a skin contour, said pivot axis extending substantially parallel to a longitudinal direction of said rows of comb-like cutting teeth, wherein said support structure includes a rigid pivot axis holder having a mounting portion for fixedly attaching said rigid pivot axis holder to a handle or chassis portion of said shaver/trimmer, wherein said rigid pivot axis holder includes a U-shaped or V-shaped holding frame element made from metal, and wherein said U-shaped or V-shaped holding frame element comprises a pair of support flanges that are rotatably connected to said pivot bearing sections to define said pivot axis.

2. The electric shaver or trimmer, according to claim 1, wherein said other parts of said support structure other than said rigid pivot axis holder are made from separate plastic or metal parts.

3. The electric shaver or trimmer, according to claim 1, wherein said rigid pivot axis holder includes two frame portions extending into or towards a cutter head chamber defined by said cutting elements and outer frame portions of said support structure holding opposite edges of one of said cutting elements.

4. The electric shaver or trimmer, according to claim 1, wherein said handle comprises an elongate housing which extends from a lower end to an upper end and wherein said rigid pivot axis holder is provided on top of said upper end of said housing and is at least partly uncovered by said elongate housing of said handle.

5. The electric shaver or trimmer, according to claim 1, wherein said pivot axis is positioned offset from a middle plane, wherein said middle plane extends perpendicular to a center section of said skin contact/facing surface of said cutting elements, wherein said middle plane is closer to a first one of said rows of comb-like cutting teeth than to a second one of said rows of comb-like cutting teeth.

6. The electric shaver or trimmer, according to claim 1, wherein at least one field of cutting perforations is arranged between said rows of comb-like cutting teeth, which cutting perforations are formed in said skin contact/facing surface of said cutting elements.

7. The electric shaver or trimmer, according to claim 1, wherein a first one of said rows of comb-like cutting teeth closer to said pivot axis forms a front side row of cutting teeth at a leading edge of said cutting elements when moving said cutting elements along skin to be shaved in a common moving direction intuitively used by a majority of users.

8. The electric shaver or trimmer, according to claim 6, wherein said support structure comprises an inner frame, an outer frame, and support ribs, wherein said support structure is configured to sandwich an inner one of said cutting elements between an outer one of said cutting elements and support edges of said support ribs of said support structure, with a gap being defined between said inner frame and said outer one of said cutting elements, wherein said inner one of said cutting elements is movably received in said gap, wherein said outer frame includes a pair of outer frame portions holding said outer one of said cutting elements at opposite edge portions thereof, wherein said support ribs extend from a base portion of said support structure and form said support edges supporting said inner one of said cutting elements along an outer edge of said at least one field of cutting perforations.

9. The electric shaver or trimmer, according to claim 8, wherein said support ribs extend from said base portion of said support structure at an angle (β) from 2×20° to 2×40°, and are spaced from each other at a distance ranging from 35% to 70% of a distance defined between said rows of comb-like cutting teeth at said opposite edges of said cutting elements, and define a V-shape and have a linear contour with flat, substantially parallel side surfaces when viewed in cross-section.

10. The electric shaver or trimmer, according to claim 1, wherein, in a home position of said cutting elements relative to said pivot axis, said cutting elements are inclined relative to a longitudinal handle axis of a handle of said shaver/trimmer at an acute angle (δ) so that said skin contact/facing surface of said cutting elements faces towards a front side of said handle of said shaver/trimmer, wherein a first one of said rows of comb-like cutting teeth which is closer to said pivot axis, is facing said front side, whereas a second one of said rows of comb-like cutting teeth is facing towards an opposite back side.

11. The electric shaver or trimmer, according to claim 1, wherein said pivot axis is positioned under said skin contact/facing surface of said cutting elements and/or extends within a cutter head chamber encompassed by said cutting elements and outer frame portions of said support structure holding opposite edges of one of said cutting elements.

12. The electric shaver or trimmer, according to claim 1, wherein said support structure is configured to provide for a pivot range about said pivot axis, which pivot range is asymmetrical with regard to a longitudinal handle axis of a handle of said shaver/trimmer, wherein said skin contact/facing surface of said cutting elements faces towards a same side of said handle over at least ⅔ of said pivot range.

13. The electric shaver or trimmer, according to claim 1, wherein said support structure is configured to provide for a pivot angle (α) ranging from −20° to +60°, +/−10°, said angle (α) being defined between a virtual plane extending perpendicular to a longitudinal handle axis of a handle of said shaver/trimmer and a virtual plane tangential to said skin contact/facing surface of said cutting elements.

14. The electric shaver or trimmer, according to claim 1, wherein said spring device biases said cutting elements about said pivot axis towards an end of a limited pivot range.

15. The electric shaver or trimmer, according to claim 14, wherein said spring device is configured to urge said cutting elements into a pivoting position with a smallest possible angle of inclination (δ) of said skin contact/facing surface to a longitudinal handle axis of a handle of said shaver/trimmer.

16. The electric shaver or trimmer, according to claim 1, wherein said pivot axis has a fixed position relative to one of said cutting elements and a fixed position relative to a handle of said shaver/trimmer.

17. The electric shaver or trimmer, according to claim 1, wherein at least one of said cutting elements, when viewed in cross-section, has a C-shape including a pair of dog-eared holding flanges attached to said support structure and a slightly dome-shaped or flat center section.

18. An electric shaver or trimmer, comprising:

a cutter system having a pair of cooperating cutting elements with two rows of comb-like cutting teeth at opposite edges thereof and a skin contact surface or skin facing surface of said cutting elements, and a spring device for biasing said cutting elements about said pivot axis, wherein said cutting elements are movably supported relative to each other by a support structure, wherein said support structure comprises an outer frame comprising a pair of pivot bearing sections, wherein said pair of pivot bearing sections provide for a pivot axis about which said cooperating cutting elements are pivotable to follow a skin contour, said pivot axis extending substantially parallel to a longitudinal direction of said rows of comb-like cutting teeth, wherein said pivot axis is positioned offset from a middle plane, wherein said middle plane extends perpendicular to a center section of said skin contact/facing surface of said cutting elements, and wherein said middle plane is closer to a first one of said rows of comb-like cutting teeth than to a second one of said rows of comb-like cutting teeth, and wherein said support structure includes a pivot axis holder having a mounting portion for fixedly attaching said pivot axis holder to a handle or chassis portion of said shaver/trimmer, wherein said pivot axis holder includes a U-shaped or V-shaped holding frame element, said U-shaped or V-shaped holding frame element comprising a pair of support flanges that are rotatably connected to said pivot bearing sections to define said pivot axis.

* * * * *